United States Patent [19]
Matsumoto et al.

[11] Patent Number: 5,544,482
[45] Date of Patent: Aug. 13, 1996

[54] EXHAUST GAS-PURIFYING SYSTEM FOR INTERNAL COMBUSTION ENGINES

[75] Inventors: Seiji Matsumoto; Takuya Aoki; Yuichi Shimasaki; Seiji Hatcho; Toshikazu Oketani; Yukio Miyashita; Akihisa Saito; Takashi Komatsuda; Hiroaki Kato, all of Wako, Japan

[73] Assignee: Honda Giken Kogyo Kabushiki Kaisha, Tokyo, Japan

[21] Appl. No.: 405,517

[22] Filed: Mar. 16, 1995

[30] Foreign Application Priority Data

Mar. 18, 1994 [JP] Japan .................................. 6-073911

[51] Int. Cl.⁶ ........................................................ F01N 3/18
[52] U.S. Cl. ................................ 60/279; 60/277; 60/297; 60/311
[58] Field of Search ............................ 60/277, 279, 297, 60/311

[56] References Cited

U.S. PATENT DOCUMENTS

| | | | |
|---|---|---|---|
| 5,125,231 | 6/1992 | Patil et al. ................................. | 60/274 |
| 5,184,462 | 2/1993 | Schatz ........................................ | 60/311 |
| 5,307,627 | 5/1994 | Christensen et al. ..................... | 60/300 |
| 5,315,824 | 5/1994 | Takeshima ................................ | 60/297 |
| 5,375,414 | 12/1994 | Adamczyk, Jr. et al. ................ | 60/311 |
| 5,388,405 | 2/1995 | Fujishita et al. .......................... | 60/297 |

FOREIGN PATENT DOCUMENTS

5-171929  7/1993  Japan .

Primary Examiner—Leonard E. Heyman
Attorney, Agent, or Firm—Nikaido, Marmelstein, Murray & Oram LLP

[57] ABSTRACT

An exhaust gas-purifying system for an internal combustion engine has an adsorbing device arranged in an exhaust passage thereof for adsorbing or desorbing unburnt component contained in exhaust gases. An exhaust gas recirculation passage branches off from the exhaust passage at a branch point downstream of the adsorbing device and extending to an intake passage of the engine for returning exhaust gases flowing through the adsorbing device to the intake passage. The path of exhaust gases is changed to selectively introduce the exhaust gases containing the unburnt components into the exhaust gas recirculation passage. The adsorbing capacity of the adsorbing device is checked based on a manner of change in an air-fuel ratio of exhaust gases detected when the exhaust gases are introduced into the exhaust gas recirculation passage.

13 Claims, 7 Drawing Sheets

EXHAUST GAS-PURIFYING SYSTEM FOR INTERNAL COMBUSTION ENGINES

BACKGROUND OF THE INVENTION

1. Field of the Invention

This invention relates to an exhaust gas-purifying system for internal combustion engines, and more particularly to an exhaust gas-purifying system of this kind having an adsorbing device arranged in the exhaust system of an internal combustion engine, for adsorbing unburnt components.

2. Prior Art

In the technical field of internal combustion engines, it is well known that a catalytic converter (three-way catalyst) is arranged in the exhaust system of the engine, for purifying noxious components, such as HC, CO, and NOx present in exhaust gases emitted from the engine.

On the other hand, to overcome an inconvenience resulting from the fact that the catalytic converter is not activated until it is warmed up to a temperature exceeding a predetermined value, an exhaust gas-purifying system has already been proposed e.g. by Japanese Laid-Open Patent Publication (Kokai) No. 5-171929, which includes an adsorbing device for temporarily adsorbing unburnt components including HC, provided in the exhaust system together with the catalytic converter, thereby achieving satisfactory exhaust emission characteristics even when the catalytic converter has not been activated, e.g. when the engine is started in a cold condition.

Figure 1:
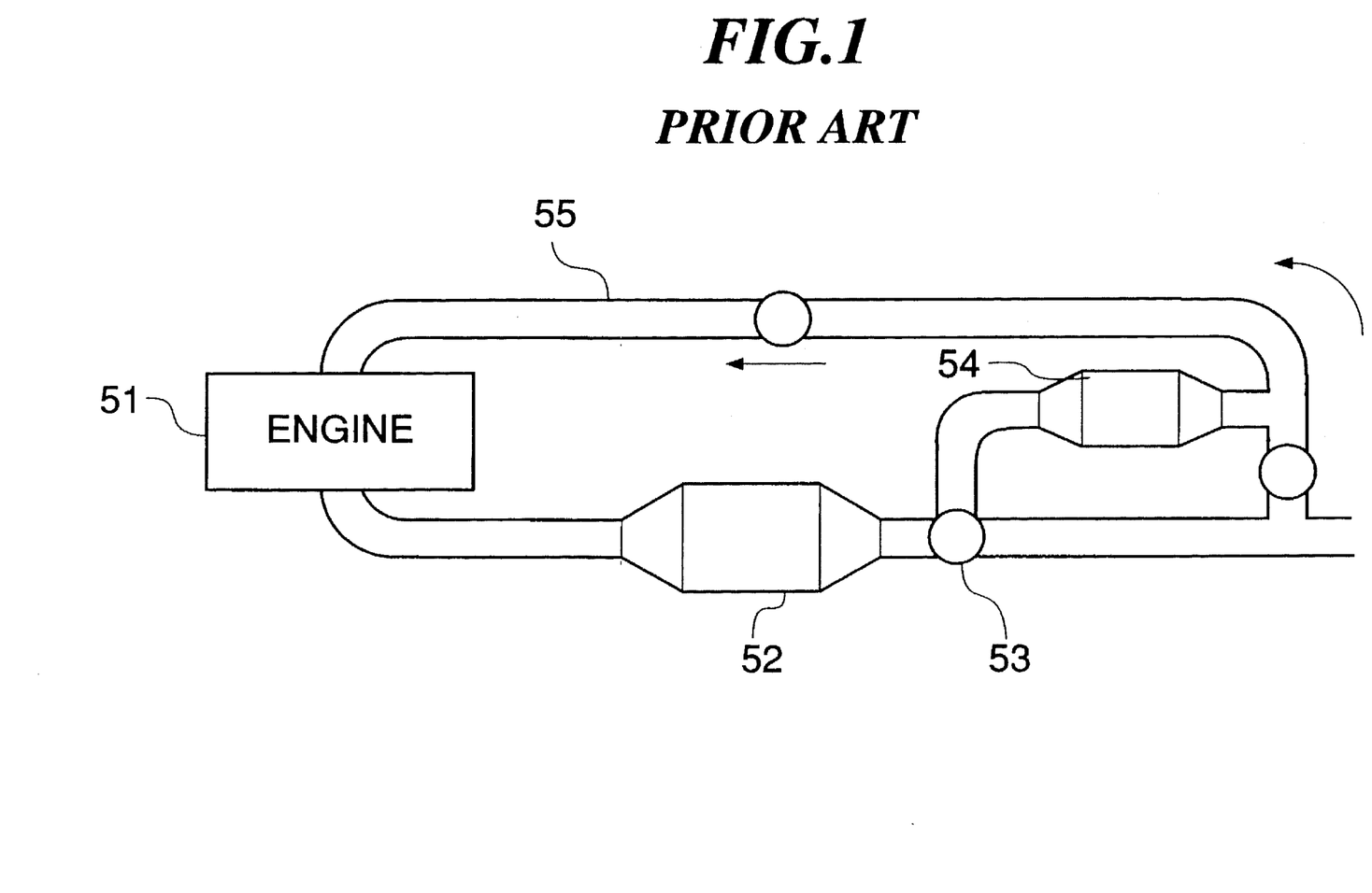
FIG. 1 is a block diagram schematically showing the arrangement of a conventional exhaust gas-purifying system for an internal combustion engine.

The proposed exhaust gas-purifying system is constructed as shown in FIG. 1: HC and other unburnt components contained in exhaust gases emitted from an internal combustion engine 51 when the engine is started in a cold condition flow through a catalytic converter 52 and are guided by a changeover valve 53 to an adsorbing device 54 to be adsorbed thereby. When the temperature of an adsorbent charged in the adsorbing device 54 rises up to a predetermined value, the unburnt components are desorbed therefrom and returned via an exhaust gas return passage 55 to the engine 51, for combustion therein again.

However, the proposed exhaust gas-purifying system has a drawback that when the adsorbing device 54 ceases to normally function due to deterioration or aging thereof, the adsorbing capacity thereof is degraded below a predetermined level, adversely affecting exhaust emission characteristics of the engine, etc.

SUMMARY OF THE INVENTION

It is the object of the invention to provide an exhaust gas-purifying system for internal combustion engines, which is capable of easily and accurately determining the adsorbing capacity of an adsorbing device provided in the engine which adsorbs and desorbs unburnt components contained in exhaust gases from the engine.

To attain the above object, the present invention provides an exhaust gas-purifying system for an internal combustion engine having an intake passage, an exhaust passage, air-fuel ratio-detecting means arranged in the exhaust passage, for detecting an air-fuel ratio of exhaust gases emitted from the engine, and air-fuel ratio control means for calculating an air-fuel ratio control amount for control of an air-fuel mixture supplied to the engine to a predetermined air-fuel ratio, the exhaust gas-purifying system having an adsorbing device arranged in the exhaust passage for adsorbing or desorbing unburnt components contained in the exhaust gases.

The exhaust gas-purifying system according to the invention characterized by comprising:

an exhaust gas recirculation passage branching off from the exhaust passage at a branch point downstream of the adsorbing device and extending to the intake passage, for returning exhaust gases flowing through the adsorbing device to the intake passage;

changeover means for changing a path of exhaust gases to selectively introduce the exhaust gases containing the unburnt components into the exhaust gas recirculation passage; and adsorbing capacity-checking means for checking adsorbing capacity of the adsorbing device, based on a manner of change in the air-fuel ratio detected by the air-fuel ratio-detecting means when the exhaust gases are introduced into the exhaust gas recirculation passage.

Preferably, the adsorbing capacity-checking means checks the adsorbing capacity of the adsorbing device, based on a manner of change in the air-fuel ratio control amount calculated when the exhaust gases are introduced into the exhaust gas recirculation passage.

Preferably, the exhaust passage has a branch passage bypassing the adsorbing device in a fashion branching off from the exhaust passage at a second branch point upstream of the adsorbing device and joining the exhaust passage at a point downstream of the first-mentioned branch point, and second changeover means arranged in the exhaust passage at the second branch point, for selectively introducing the exhaust gases into the exhaust passage and the bypass passage.

Preferably, the exhaust gas-purifying system includes temperature-detecting means for detecting a temperature of the adsorbing device, and check-permitting means for permitting execution of checking of the adsorbing capacity of the adsorbing device by the adsorbing capacity-checking means, when the temperature of the adsorbing device detected by the temperature-detecting means is above a predetermined value.

Preferably, the adsorbing capacity-detecting means includes abnormality-detecting means for determining that there is abnormality in the adsorbing device when a time period over which the air-fuel ratio control amount calculated by the air-fuel ratio control means is below a predetermined value is shorter than a predetermined time period.

Alternatively, the exhaust gas-purifying system includes difference-calculating means for calculating a difference between the air-fuel ratio control amount calculated by the air-fuel ratio control means and a predetermined reference value, and the adsorbing capacity-detecting means includes abnormality-detecting means for determining that there is abnormality in the adsorbing device when a cumulative value of the difference over a predetermined time period is below a predetermined value.

The above and other objects, features, and advantages of the invention will be more apparent from the following detailed description taken in conjunction with the accompanying drawings.

DETAILED DESCRIPTION

The invention will now be described in detail with reference to the drawings showing embodiments thereof.

Figure 2:
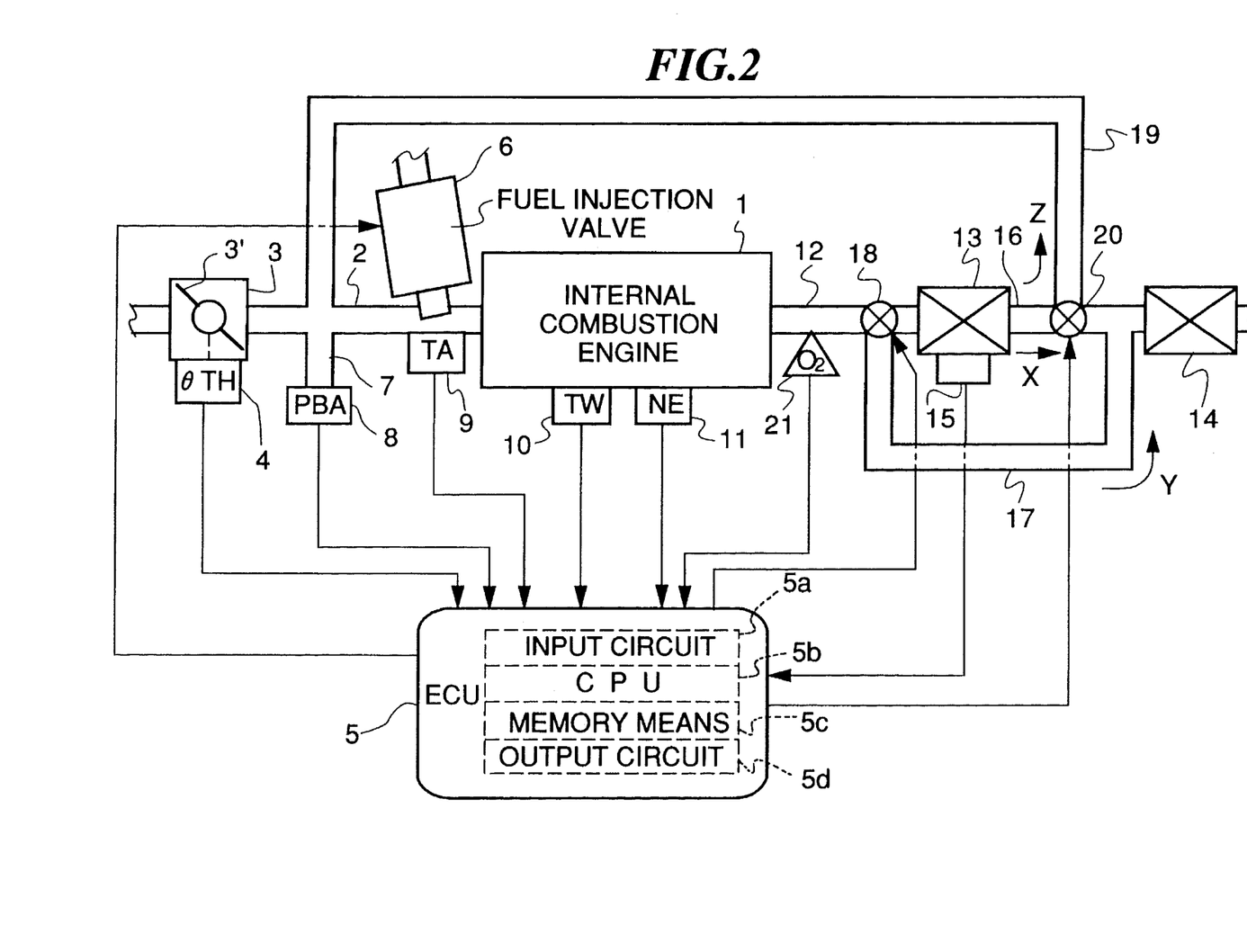
FIG. 2 is a block diagram schematically showing the whole arrangement of an internal combustion engine and an exhaust gas-purifying system therefor, according to a first embodiment of the invention.

Referring first to FIG. 2, there is shown the whole arrangement of an internal combustion engine and an exhaust gas-purifying system therefor, according to a first embodiment of the invention.

In the figure, reference numeral 1 designates a DOHC straight type four-cylinder internal combustion engine (hereinafter referred to as "the engine"), each cylinder being provided with a pair of intake valves and a pair of exhaust valves, not shown. In an intake pipe 2 of the engine 1, there is arranged a throttle body 3 accommodating a throttle valve 3' therein. A throttle valve opening (θTH) sensor 4 is connected to the throttle valve 3', for generating an electric signal indicative of the sensed throttle valve opening and supplying the same to an electronic control unit (hereinafter referred to as "the ECU") 5.

Fuel injection valves 6, only one of which is shown, are inserted into the interior of the intake pipe 2 at locations intermediate between the engine 1 and the throttle valve 3'. The fuel injection valves 6 are connected to a fuel pump, not shown, and electrically connected to the ECU 5 to have their valve opening periods controlled by signals therefrom.

An intake pipe absolute pressure (PBA) sensor 8 is provided in communication with the interior of the intake pipe 2 via a conduit 7 opening into the intake pipe 2 at a location downstream of the throttle valve 3', for supplying an electric signal indicative of the sensed absolute pressure PBA within the intake pipe 2 to the ECU 5.

An intake air temperature (TA) sensor 9 is mounted in the wall of the intake pipe 2 at a location downstream of the conduit 7, for supplying an electric signal indicative of the sensed intake air temperature TA to the ECU 5.

An engine coolant temperature (TW) sensor 10, which may be formed of a thermistor or the like, is inserted into a coolant passage filled with a coolant and formed in the cylinder block, for supplying an electric signal indicative of the sensed engine coolant temperature TW to the ECU 5.

Further, an engine rotational speed (NE) sensor 11 is arranged in facing relation to a camshaft or a crankshaft of the engine 1, neither of which is shown.

The NE sensor 11 generates a pulse as a TDC signal pulse at each of predetermined crank angles whenever the crankshaft rotates through 180 degrees, the pulse being supplied to the ECU 5.

An adsorbing device 13 and a catalytic converter 14 are serially arranged in an exhaust pipe 12 extending from the cylinder block of the engine 1.

The adsorbing device 13 accommodates therein an adsorbent formed of zeolite or the like, by which unburnt components such as HC present in exhaust gases are adsorbed when the exhaust gases are at a low temperature, as will occur when the engine is started in a cold condition. When the temperature of the exhaust gases exceeds a predetermined value (e.g. 200° C.), the unburnt components are desorbed from the adsorbing device 13.

The adsorbing device 13 has an adsorbent temperature (THC) sensor 15 mounted therein for detecting the temperature (THC) of the adsorbent, which is electrically connected to the ECU 5, for supplying an electric signal indicative of the sensed adsorbent temperature THC to the ECU 5.

The catalytic converter 14 is comprised of a three-way catalyst and effectively operates mainly after the engine has been warmed up, to purify noxious components, such as HC, CO, and NOx present in exhaust gases.

A bypass passage 17 extends from the exhaust pipe 12 in a fashion bypassing a main exhaust passage 16 in which the adsorbing device 13 is arranged, with an upstream end thereof being connected to the exhaust pipe 14 to form a branch point together therewith. Further, a first path changeover valve 18 is arranged in the exhaust pipe 12 at the upstream end of the bypass passage 17 or at the branch point. The first path changeover valve 18 is electrically connected to the ECU 5, and controlled thereby for changing the path of exhaust gases.

An exhaust recirculation passage 19 extends between the main exhaust passage 16 and the intake pipe 2 in a fashion bypassing the engine 1, with a second path changeover valve 20 being arranged in the main exhaust passage 16 at a branch point at which the exhaust recirculation passage 19 branches off from the main exhaust passage 16. The second path changeover valve 20 is electrically connected to the ECU 5 to have its operation controlled thereby.

Arranged in the exhaust pipe 12 at a location upstream of the first path changeover valve 18 is an oxygen concentration sensor 21 (hereinafter referred to as "the O2 sensor"). The O2 sensor 21 detects the concentration of oxygen contained in exhaust gases, and delivers a signal indicative of the sensed oxygen concentration to the ECU 5.

The ECU 5 is comprised of an input circuit 5a having the function of shaping the waveforms of input signals from various sensors including those mentioned above, shifting the voltage levels of sensor output signals to a predetermined level, converting analog signals from analog-output sensors to digital signals, and so forth, a central processing unit (hereinafter referred to as "the CPU") 5b, memory means 5c storing various operational programs which are executed by the CPU 5b and for storing results of calculations therefrom, etc., and an output circuit 5d which outputs driving signals to the fuel injection valves 6, the first and second path changeover valves 18, 20, etc.

The CPU 5b operates in response to the above-mentioned signals from the sensors to determine operating conditions in which the engine 1 is operating, such as an air-fuel ratio feedback control region in which air-fuel ratio control is carried out in response to oxygen concentration in exhaust gases, and open-loop control regions, and calculates, based upon the determined engine operating conditions, a valve opening period or fuel injection period TOUT over which the fuel injection valves 6 are to be opened in synchronism with generation of TDC signal pulses, by 15 the use of the following equation (1):

$$Tout = Ti \times KO2 \times K1 + K2 \qquad (1)$$

where Ti represents a basic value of the fuel injection period Tout, which is determined according to engine operating parameters, such as the engine rotational speed NE and the intake pipe absolute pressure PBA indicative of load on the engine, by the use of a Ti map, not shown, which is stored in the memory means 5c.

KO2 represents an air-fuel ratio correction coefficient calculated based on the output signal from the O2 sensor 21, which is set to such a value that the air-fuel ratio (oxygen concentration) detected by the O2 sensor 21 becomes equal to a desired value when the engine 1 is operating in the air-fuel ratio feedback control region, while it is set to predetermined values corresponding to the respective open-loop control regions of the engine 1 when the engine 1 is in the open-loop control regions.

K1 and K2 represent other correction coefficients and correction variables, respectively, which are set according to engine operating parameters to such values as optimize engine operating characteristics, such as fuel consumption and engine accelerability.

The exhaust gas-purifying system changes over the flow path of exhaust gases by operating the first path changeover valve 18 and the second path changeover valve 20.

The operative states of the first path changeover valve 18 and the second path changeover valve 20 are defined as shown below in TABLE 1:

TABLE 1

| | OPERATIVE STATE OF VALVE | VALVE POSITION |
| --- | --- | --- |
| 1ST PATH CHANGEOVER VALVE 18 | FULLY OPEN TO MAIN EXHAUST PASSAGE 16 | A |
| | OPEN TO BOTH MAIN EXHAUST PASSAGE 16 AND BYPASS PASSAGE 17 | B |
| | FULLY OPEN TO BYPASS PASSAGE 17 | C |
| 2ND PATH CHANGEOVER VALVE 20 | FULLY OPEN TO EXHAUST GAS RECIRCULATION PASSAGE 19 | A |
| | FULLY SHUT OFF MAIN EXHAUST PASSAGE 16 AND EXHAUST GAS RECIRCULATION PASSAGE 19 | B |
| | FULLY OPEN TO MAIN EXHAUST PASSAGE 16 | C |

In response to a driving signal from the ECU 5, the first path changeover valve 18 is selectively set to a valve position "A" in which it is fully open to the main exhaust passage 16 to allow all the exhaust gases to flow to the adsorbing device 13, to a valve position "B" in which it is open both to the main exhaust passage 16 and the bypass passage 17 to allow the exhaust gases to flow into both the main exhaust passage 16 and the bypass passage 17, and to a valve position "C" in which it is fully open to the bypass passage 17 to allow all the exhaust gases to flow into the bypass passage 17.

In response to a driving signal from the ECU 5, the second path changeover valve 20 is selectively set to a valve position "A" in which it is fully open to the exhaust recirculation passage 19 to allow all the exhaust gases from the adsorbing device 13 to flow into the exhaust recirculation passage 19, to a valve position "B" in which it blocks off the main exhaust passage 16 and the exhaust recirculation passage 19 to prevent the exhaust gases including unburnt components from flowing into the exhaust recirculation passage 19, and to a valve position "C" in which it is fully open to the main exhaust passage 12 to allow all the exhaust gases from the adsorbing device 13 to flow into the catalytic converter 14.

Figure 3:
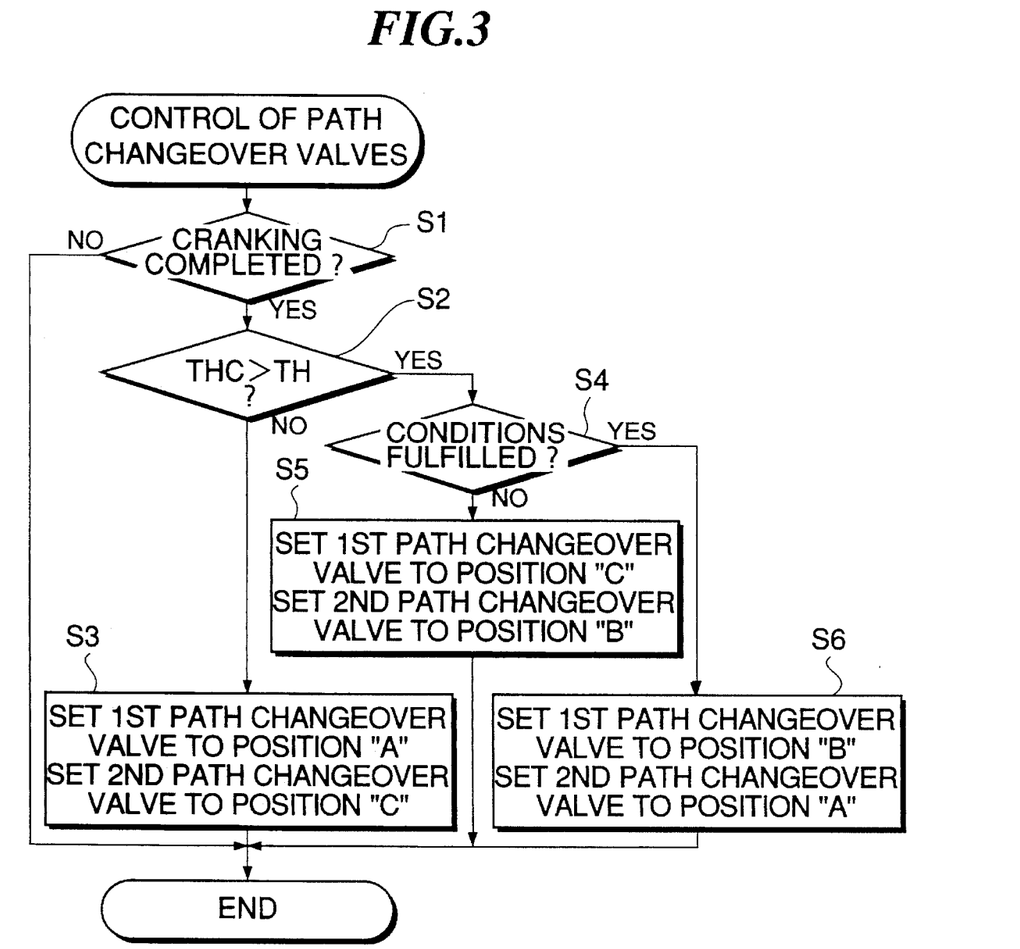
FIG. 3 is a flowchart showing a routine for controlling changeover of the operation of a first path changeover valve and a second path changeover valve appearing in FIG. 2, executed by the first embodiment of the invention.

FIG. 3 shows a routine for controlling changeover of the operation of the first and second path changeover valves 18 and 20, which is executed by the CPU 5b of the ECU5, whenever a timer incorporated in the ECU 5 counts up 100 msec.

First, at a step S1, it is determined whether or not the engine has completed cranking. The determination as to completion of cranking is carried out by determining whether or not the engine has shifted from a predetermined cranking mode into a basic operating mode, or whether a predetermined time period has elapsed after the start of the engine. In addition, whether or not the engine is being in the cranking mode is determined according to whether a starter switch, not shown, of the engine is turned on, and at the same time the engine rotational speed is lower than a predetermined cranking speed value.

Then, if the answer to the question of the step S1 is negative (NO), the program is immediately terminated, while if the answer is affirmative (YES), it is determined at a step S2 whether or not the adsorbent temperature THC detected by the THC sensor 15 is above a predetermined value TH. The predetermined value TH is set to a desorbing temperature, e.g 200° C., at which the unburnt components adsorbed by the adsorbing device 13 start to be desorbed therefrom. When the engine has not been fully warmed up after the start of the engine, the answer to the question of the step S2 is negative (NO). On this occasion, the first path changeover valve 18 is set to the valve position "A", while the second path changeover valve 20 to the valve position "C", at a step S3, followed by terminating the program. That is, the exhaust gases are permitted to flow in the direction of the arrow X in FIG. 2, whereby the unburnt components emitted from the engine 1 are adsorbed by the adsorbing device 1, thereby preventing unburnt components in the exhaust gases from being emitted into the atmosphere.

Further, if the answer to the question of the step S2 is affirmative (YES), i.e. if the temperature of the adsorbent of the adsorbing device 13 becomes higher than the predetermined value TH to cause the unburnt components to be desorbed or released therefrom, the program proceeds to a step S4, where it is determined whether conditions are fulfilled for checking the adsorbing capacity of the adsorbing device 13. The determination as to fulfillment of the conditions is carried out by determining whether the catalyst bed temperature of the catalytic converter 14 (which is estimated based on operating conditions of the engine, etc.) is above a predetermined value, or whether the air-fuel ratio feedback control is being executed. If the answer to this question is negative (NO), i.e. if the conditions for checking the adsorbing capacity of the adsorbing device 13 are not fulfilled, the first path changeover valve 18 is set to the valve position "C", while the second path changeover valve 20 is set to the valve position "B" at a step S5, followed by terminating the program. That is, on this occasion, the adsorbent temperature THC of the adsorbing device 13 has reached the desorbing temperature and hence the catalytic converter 14 is in a nearly activated state though it is not completely activated. Therefore, all the exhaust gases are caused to flow in the direction of the arrow Y, i.e. via the bypass passage 17 and the catalytic converter 14 into the atmosphere, while allowing the unburnt components to be held in the adsorbing device 13 without being released therefrom.

Further, if the answer to the question of the step S4 is affirmative (YES), i.e. if the catalytic converter 14 has been activated, the program proceeds to a step S6, where the first path changeover valve 18 is set to the valve position "B", and the second passage changeover valve 20 to the valve position "A", followed by terminating the program. That is, on this occasion, part of the exhaust gases are caused to flow in the direction of the arrow Y for purification by the catalytic converter 14, and at the same time the remaining part of the exhaust gases are caused to flow in the direction of the arrow Z, for combustion in the engine 1 again.

The CPU 5b further includes adsorbing capacity checking means (including abnormality-detecting means) for checking exhaust gas-purifying system checks the adsorbing capacity of the adsorbing device 13 based on a manner of change in the air-fuel ratio correction coefficient KO2 based on output of the $O_2$ sensor 21 used for air-fuel ratio control of the mixture supplied to the engine 1 when exhaust gases are introduced into the exhaust gas recirculation passage 19. That is, the exhaust gas-purifying system of the invention determines whether or not the adsorbing device 13 has sufficient adsorbing capability through monitoring of variation in the air-fuel ratio correction coefficient KO2, when the exhaust gases are permitted to flow in both the directions of the arrows Y and Z.

Figure 4:
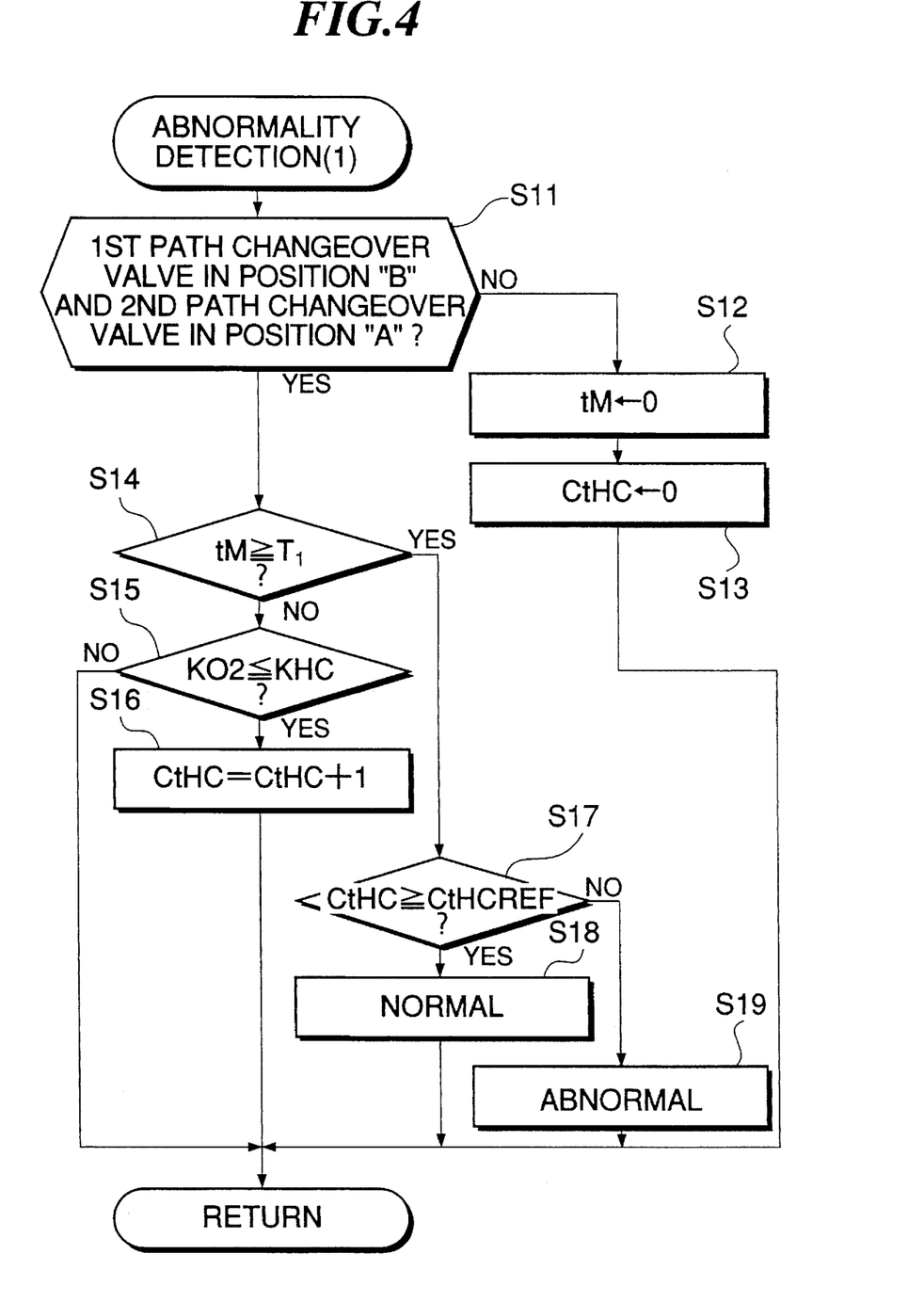
FIG. 4 is a flowchart showing an abnormality-detecting routine according to the first embodiment of the invention.

FIG. 4 shows an abnormality-determining routine for determining abnormality of the adsorbing device 13, according to the first embodiment of the invention, which is executed by the CPU 5b of the ECU5, whenever the timer incorporated in the ECU 5 counts up 100 msec.

First, at a step S11, it is determined whether or not the first path changeover valve 18 is in the valve position "B" and at the same time the second path changeover valve 20 is in the position "A". If the answer to this question is negative (NO), i.e. if exhaust gases are caused to flow in only one of the directions of the arrows X and Y, the count tM of a tM timer is set to "0" at a step S12, and the count CtHC of a CtHC counter is set to "0" at a step S13, since no exhaust gases are returned to the intake pipe 2, followed by terminating the program. On the other hand, if the answer to the question of the step S11 is affirmative (YES), i.e. if the exhaust gases are permitted to flow in both the directions of the arrows X and Y, the program proceeds to a step S14, it is determined whether or not the count tM of the tM timer has counted up a predetermined time period T1 (e.g. 10 seconds). If the answer to this question is negative (NO), the program proceeds to a step S15, where it is determined whether or not the air-fuel ratio correction coefficient KO2 calculated by a KO2-calculating routine, not shown, is smaller than a predetermined value KHC. That is, when part of the exhaust gases flowing through the adsorbing device 13 are returned via the exhaust gas recirculation passage 19 to the intake pipe for re-combustion, the air-fuel ratio of a mixture supplied to the engine becomes temporarily rich due to unburnt components contained in the returned exhaust gases, causing the air-fuel ratio correction coefficient KO2 to shift toward a range of values (KO2 <1.0) smaller than a predetermined reference value. The resulting KO2 value shifted into the range is compared with the predetermined value KHC (e.g. 0.8). If the answer to the question of the step S15 is affirmative (YES), i.e. if KO2≦KHC, the count CtHC of the CtHC counter is incremented by "1" at a step S16 followed by terminating the program. If the answer to the question of the step S15 is negative (NO), the program is immediately terminated. On the other hand, if the answer to the question of the step S14 is affirmative (YES), the program proceeds to a step S17, where it is determined whether or not the count CtHC is larger than a predetermined reference value CtHCREF (e.g. 100). If the answer to this question is affirmative (YES), it is determined at a step S18 that the adsorbing device 13 is normally functioning, followed by terminating the program. If the answer to the question of the step S17 is negative (NO), the program proceeds to a step S19, where it is determined that the adsorbing device 13 is abnormal, followed by terminating the program.

As described above, when the exhaust gases containing the unburnt components released from the adsorbing device 13 are returned to the intake pipe 2 for combustion in the engine, the air-fuel ratio coefficient KO2 temporarily shifts to a smaller value for leaning the air-fuel ratio, due to supply of an additional amount of fuel (unburnt components) by recirculation of the exhaust gases, over a normal time period, so long as the adsorbing device 13 is normally functioning. However, if the adsorbing capacity of the adsorbing device 13 is degraded e.g. due to aging thereof, the amount of unburnt gas adsorbed by the adsorbing device 13 becomes so small that the time period over which the air-fuel ratio correction coefficient is smaller than the predetermined value KHC becomes short. Based on this finding, in the present embodiment, the time period over which the air-fuel ratio correction coefficient KO2 is smaller than the predetermined value KHC is counted, and the resulting count CtHC is compared with the predetermined reference value CtHCREF, thereby determining abnormality of the adsorbing device 13.

Figure 5:
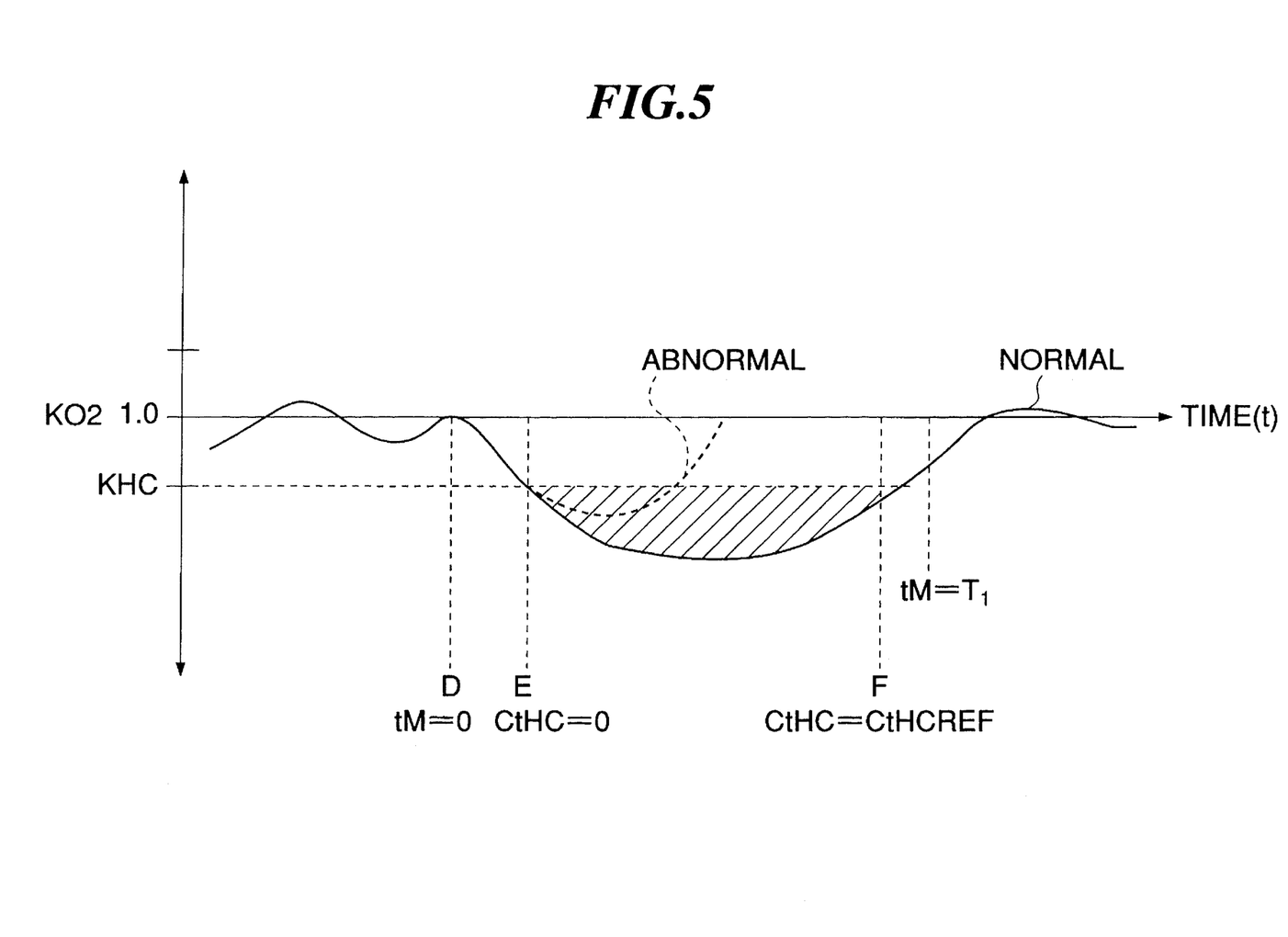
FIG. 5 is a time chart showing the relationship between an air-fuel ratio coefficient KO2 and time (t) immediately after the start of the engine.

FIG. 5 shows the relationship between the air-fuel ratio correction coefficient KO2 and a time period (t) elapsed immediately after the start of the engine. When the conditions for checking the adsorbing capacity of the adsorbing device 13 become fulfilled at a time point D, the first path changeover valve 18 is set to the position "B" and the second path changeover valve 20 to the position "A", thereby starting the recirculation of the exhaust gases flowing through the adsorbing device 13 to the intake pipe via the exhaust recirculation passage 19 while starting the tM timer. Then, at a time point E at which the air-fuel ratio coefficient KO2 becomes equal or lower than the predetermined value KHC, the count CtHC of the CtHC counter, which has been set to "0", is incremented thereafter. If the air-fuel ratio coefficient KO2 becomes larger than the predetermined value KHC, the counter ceases to count. The predetermined reference value CtHCREF is set to a value corresponding to a shorter limit of a time period over which the air-fuel ratio correction coefficient KO2 should be smaller than the predetermined value KHC when the adsorbing device 13 is normally functioning. The broken curve in the figure shows a change in the air-fuel ratio correction coefficient KO2 assumed when the adsorbing device 13 is abnormal. The count CtHC of the CtHC counter exceeds the predetermined reference value CtHCREF when the tM timer counts up the predetermined time period T1, when the adsorbing device 13 is functioning normally. Whether or not the adsorbing device 13 is normally functioning can be determined by comparing the count CtHC of the timer with the predetermined value CtHCREF, after the predetermined time period T1 has elapsed. Therefore, it is possible to detect abnormality of the adsorbing device 13 accurately and quickly at an early stage of deterioration or aging thereof, and inform the driver of the fact, by lighting an alarm lamp, not shown.

Figure 6:
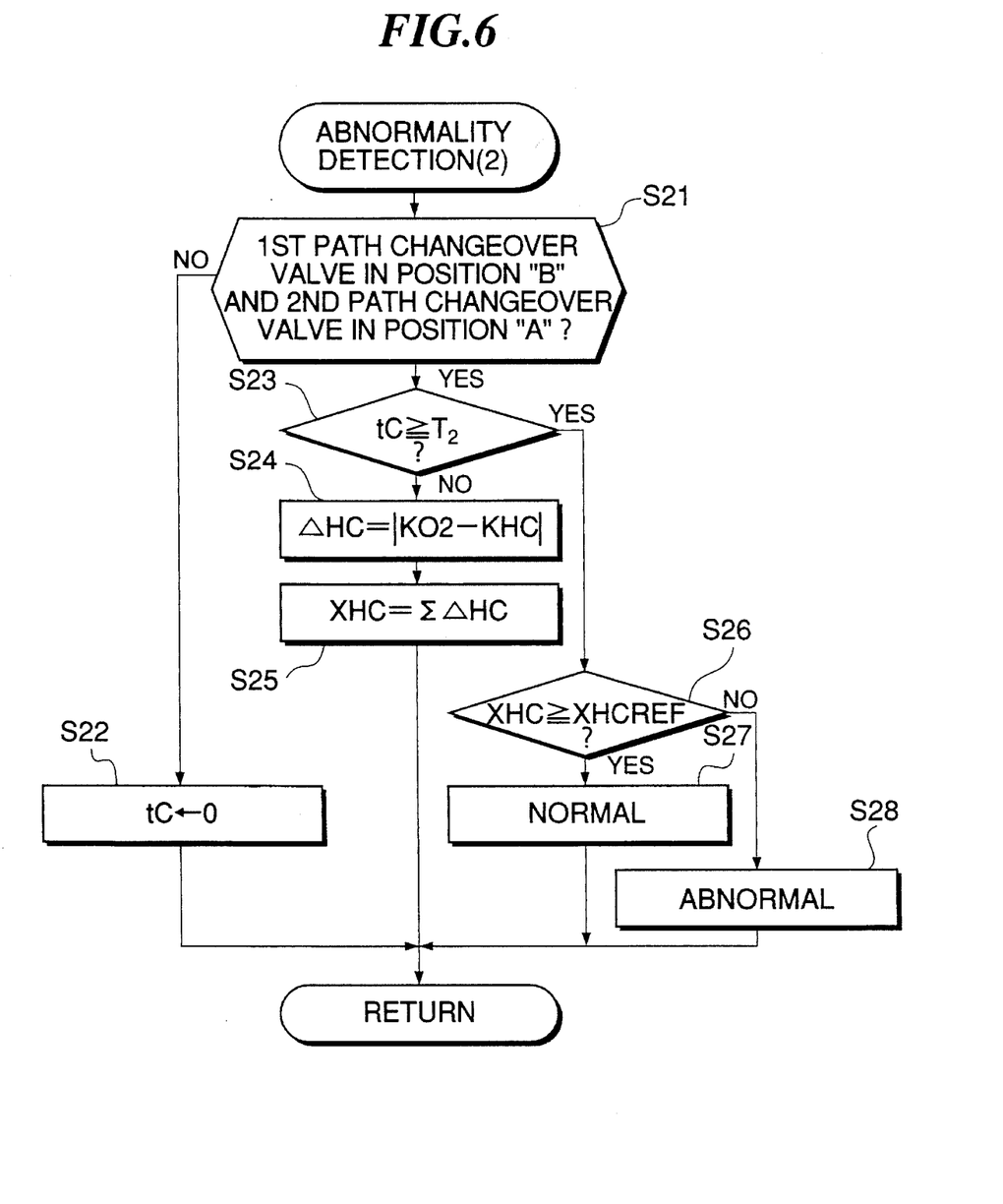
FIG. 6 is a flowchart showing an abnormality-detecting routine according to a second embodiment of the invention.

FIG. 6 shows an abnormality-detecting routine according to a second embodiment of the invention. The second embodiment is distinguished from the first embodiment described above only in the manner of detecting abnormality of the adsorbing device. More specifically, in the present embodiment, the absolute value ΔHC of the difference between the air-fuel ratio correction coefficient KO2 and the predetermined reference value KHC is calculated, and whether there is an abnormality in the adsorbing device 13 is detected based on a cumulative value XHC of the absolute value Δ HC. The present routine is also executed by the CPU 5b of the ECU5, whenever the timer incorporated in the ECU 5 counts 100 up msec.

At a step S21, it is determined in a manner similar to the first embodiment, whether or not the first path changeover valve 18 is set to the valve position "B", and the second path changeover valve 20 to the valve position "A". If the answer to this question is negative (NO), the count tC of a tC timer is set to 0 at a step S22, followed by terminating the program, whereas if the answer to the question of the step S21 is affirmative (YES), the program proceeds to a step S23, where it is determined whether or not the count tC of the tC timer has reached or exceeded a predetermined time period T2 (e.g. 10 seconds). If the answer to this question is negative (NO), the program proceeds to a step S24 where the absolute value ΔHC of the difference between the air-fuel ratio correction coefficient KO2 and the predetermined reference value KHC is calculated. Then, at a step S25, the present value of the absolute value ΔHC of the difference is added to the immediately preceding cumulative value of the absolute value ΔHC to obtain an updated cumulative value XHC, followed by terminating the program. If the answer to the question of the step S23 is affirmative (YES), it is determined at a step S26 whether or not the cumulative value XHC is equal to or larger than a predetermined value XHCREF. If the answer to this question is affirmative (YES), it is determined at a step S27 that the adsorbing device 13 is normally functioning, followed by terminating the program. That is, the cumulative value XHC corresponds to an area hatched in FIG. 5. As can be easily understood from FIG. 5, it is determined that the adsorbing device 13 is normally functioning when the hatched area or the cumulative value XHC is equal to or larger than the predetermined value XHCREF. On the other hand, if the former is smaller than the latter, it means that the air-fuel ratio coefficient KO2 becomes equal to or larger than the predetermined value KHC in a short time period due to a small amount of unburnt components released from the adsorbent of the adsorbing device, which implies deterioration or abnormality of the adsorbing device 13. Thus, it is possible to determine abnormality of the adsorbing device accurately and promptly at an early stage of deterioration.

Figure 7:
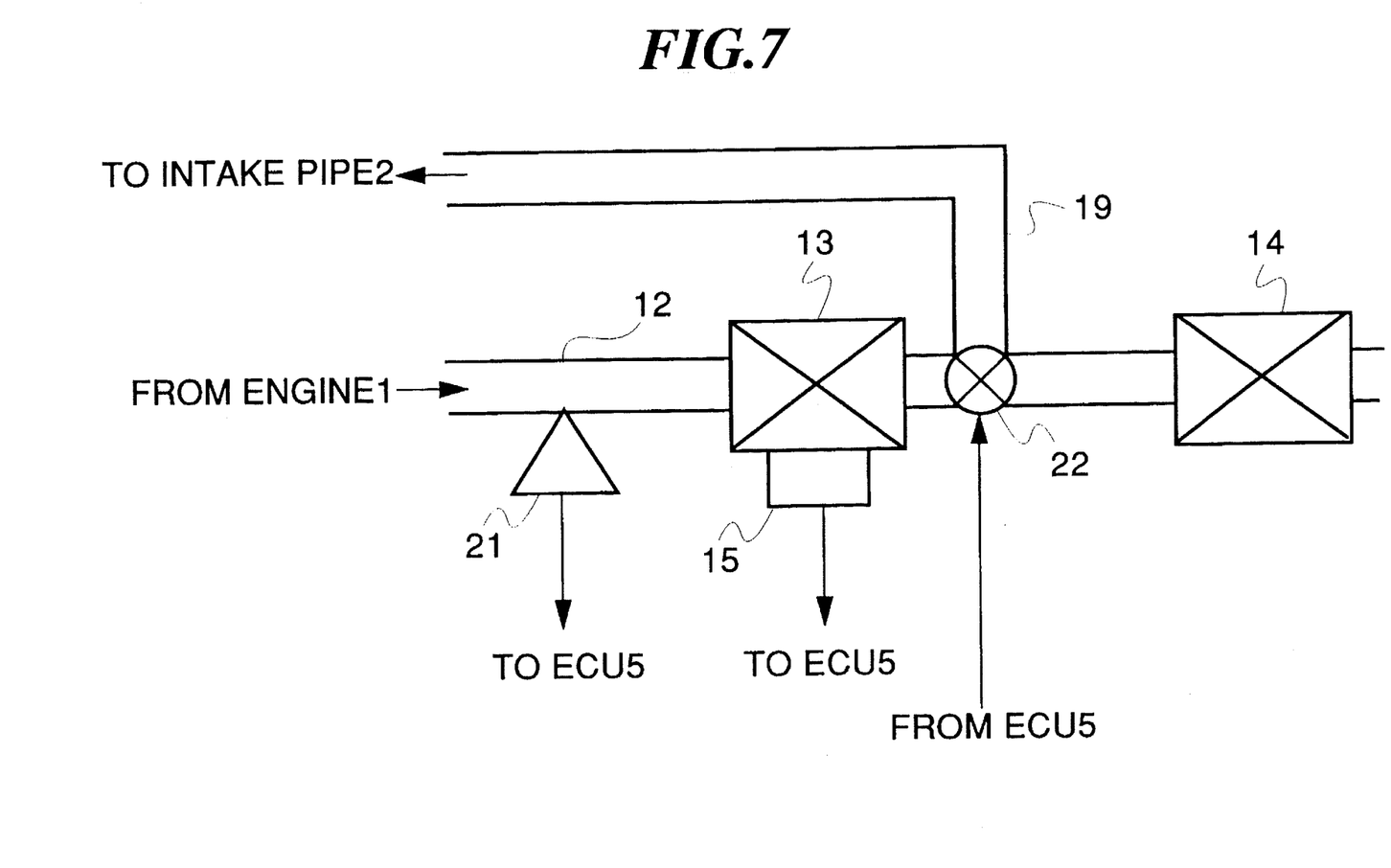
FIG. 7 is a diagram showing essential parts of a variation of the exhaust gas-purifying system according to the first embodiment of the invention.

Although in the embodiments described above, the exhaust passage 13 is bifurcated into the main exhaust passage 16 and the bypass passage 17, this is not limitative, but the bypass passage 17 may be omitted as shown in FIG. 7 for detection of abnormality of the adsorbing device. A path changeover valve 22 is arranged at a branch point at which the exhaust recirculation passage 19 branches off from the exhaust passage 12, similarly to the second path changeover valve 20 of the first embodiment. In this variation as well, the path changeover valve 22 can be controlled such that part of the exhaust gases are caused to return to the intake pipe via the exhaust recirculation passage 19, to thereby detect abnormality of the adsorbing device 13 in a manner similar to that of the first embodiment described above. However, from the viewpoint of life of the adsorbing device 13, it is preferred that the engine incorporating the exhaust gas-purifying system of the invention has the FIG. 1 arrangement.

What is claimed is:

1. In combination with an internal combustion engine having an intake passage, an exhaust passage, an air-fuel ratio sensor arranged in said exhaust passage, for detecting an air-fuel ratio of exhaust gases from said engine and generating an electric signal indicative of the detected air-fuel ratio of said exhaust gases, a control means for performing the function of calculating an air-fuel ratio control amount for controlling an air-fuel ratio of an air-fuel mixture supplied to said engine to a predetermined air-fuel ratio in response to said air-fuel ratio of said exhaust gases detected by said air-fuel ratio sensor, and an exhaust gas-purifying system including an adsorbing device arranged in said exhaust passage for adsorbing or desorbing said unburnt components contained in said exhaust gases, the improvement comprising:

an exhaust gas recirculation passage branching off from said exhaust passage at a first branch point downstream of said adsorbing device and extending to said intake passage, for returning exhaust gases flowing through said adsorbing device to said intake passage;

changeover means for changing a path of exhaust gases to selectively introduce said exhaust gases containing said unburnt components into said exhaust gas recirculation passage; and said control means further performing the function of checking adsorbing capacity of said adsorbing device, based on a manner of change in said air-fuel ratio indicated by said electric signal generated by said air-fuel ratio sensor when said exhaust gases are introduced into said exhaust gas recirculation passage.

2. The combination according to claim 1, wherein said function of checking adsorbing capacity includes determining said manner of change in said air-fuel ratio indicated by said electric signal generated by said air-fuel ratio sensor from a manner of change in said air-fuel ratio control amount calculated when said exhaust gases are introduced into said exhaust gas recirculation passage.

3. The combination according to claim 1, wherein said exhaust passage has a branch passage bypassing said adsorbing device in a fashion branching off from said exhaust passage at a second branch point upstream of said adsorbing device and joining said exhaust passage at a point downstream of said first branch point, and second changeover means arranged in said exhaust passage at said second branch point, for selectively introducing said exhaust gases into said exhaust passage and said bypass passage.

4. The combination according to claim 1, including a temperature sensor for detecting a temperature of said adsorbing device and generating an electric signal indicative of the detected temperature of said adsorbing device, and wherein said control unit further performs the function of permitting execution of checking of said adsorbing capacity of said adsorbing device when the temperature of said adsorbing device indicated by said electric signal generated by said temperature sensor is above a predetermine value.

5. The combination according to claim 3, including a temperature sensor for detecting a temperature of said adsorbing device, and wherein said control unit further performs the function of permitting execution of checking of said adsorbing capacity of said absorbing device means, when the temperature of said adsorbing device indicated by said electric signal generated by said temperature sensor is above a predetermined value.

6. The combination according to claim 1, wherein said function of checking adsorbing capacity includes determining that there is abnormality in said function of checking adsorbing capacity adsorbing device when a time period over which said air-fuel ratio control amount is below a predetermined value is shorter than a predetermined time period.

7. The combination according to claim 3, wherein said function of checking adsorbing capacity includes determining that there is abnormality in said adsorbing device when a time period over which said air-fuel ratio control amount calculated by said calculating means is below a predetermined value is shorter than a predetermined time period.

8. The combination according to claim 4, wherein said function of checking adsorbing capacity includes abnormality determining that there is abnormality in said adsorbing device when a time period over which said air-fuel ratio control amount calculated by said calculating means is below a predetermined value is shorter than a predetermined time period.

9. The combination according to claim 5, wherein said function of checking adsorbing capacity includes determining that there is abnormality in said adsorbing device when a time period over which said air-fuel ratio control amount calculated by said calculating means is below a predetermined value is shorter than a predetermined time period.

10. The combination according to claim 1, wherein said control unit further performs the functions of calculating a difference between said air-fuel ratio control amount and a predetermined reference value, and determining that there is abnormality in said adsorbing device when a cumulative value of said difference over a predetermined time period is below a predetermined value.

11. The combination according to claim 3, wherein said control unit further performs the functions of calculating a difference between said air-fuel ratio control amount and a predetermined reference value, and determining that there is abnormality in said adsorbing device when a cumulative value of said difference over a predetermined time period is below a predetermined value.

12. The combination according to claim 4, wherein said control unit further performs the functions of calculating a difference between said air-fuel ratio control amount means and a predetermined reference value, and determining that there is abnormality in said adsorbing device when a cumulative value of said difference over a predetermined time period is below a predetermined value.

13. The combination according to claim 5, wherein said control unit further performs the functions of calculating a difference between said air-fuel ratio control amount and a predetermined reference value, and determining that there is abnormality in said adsorbing device when a cumulative value of said difference over a predetermined time period is below a predetermined value.

* * * * *